United States Patent [19]

Couling et al.

[11] 4,385,013

[45] May 24, 1983

[54] METHOD AND APPARATUS FOR PRODUCING PARTICLES FROM A MOLTEN MATERIAL USING A ROTATING DISK HAVING A SERRATED PERIPHERY AND DAM MEANS

[75] Inventors: S. L. Couling, Columbus; R. E. Maringer, Worthington; L. E. Wheeler, Grove City, all of Ohio

[73] Assignee: Battelle Development Corporation, Columbus, Ohio

[21] Appl. No.: 271,554

[22] Filed: Jun. 8, 1981

[51] Int. Cl.³ .............................................. B01J 2/02
[52] U.S. Cl. ......................................... 264/8; 425/8
[58] Field of Search .................. 264/144, 140, 297, 5, 264/8; 425/8

[56] References Cited

U.S. PATENT DOCUMENTS

| | | | |
|---|---|---|---|
| 1,951,769 | 3/1934 | Pearson et al. | 264/144 |
| 2,118,438 | 5/1938 | Lawrence et al. | 264/144 |
| 2,287,087 | 6/1942 | Clausen et al. | 264/144 |
| 2,613,396 | 10/1952 | Montgomery et al. | 264/144 |
| 2,654,125 | 10/1953 | Hall | 264/144 |
| 2,847,698 | 8/1958 | Ritterson | 264/144 X |
| 3,838,185 | 9/1974 | Maringer et al. | 264/8 |
| 3,904,344 | 9/1975 | Maringer et al. | 425/472 |
| 4,124,664 | 11/1978 | Maringer | 264/8 |
| 4,242,069 | 12/1980 | Maringer | 264/8 X |

FOREIGN PATENT DOCUMENTS 449620 6/1936 United Kingdom ................ 264/144

*Primary Examiner*—Philip E. Anderson
*Attorney, Agent, or Firm*—Robert B. Watkins

[57] ABSTRACT

A method and apparatus for producing particulate directly from a supply of molten material by the use of a rotating member having discrete serrations in the periphery thereof. The leading surfaces of the serrations contact the molten material and propel a portion into a cavity formed by the surfaces of the serration while under the effect of a surface of a dam means, in proximity to which the serrations pass. The dam means is immersed in the supply of molten material adjacent to the periphery of the rotating member.

24 Claims, 10 Drawing Figures

U.S. Patent May 24, 1983 Sheet 1 of 2 4,385,013
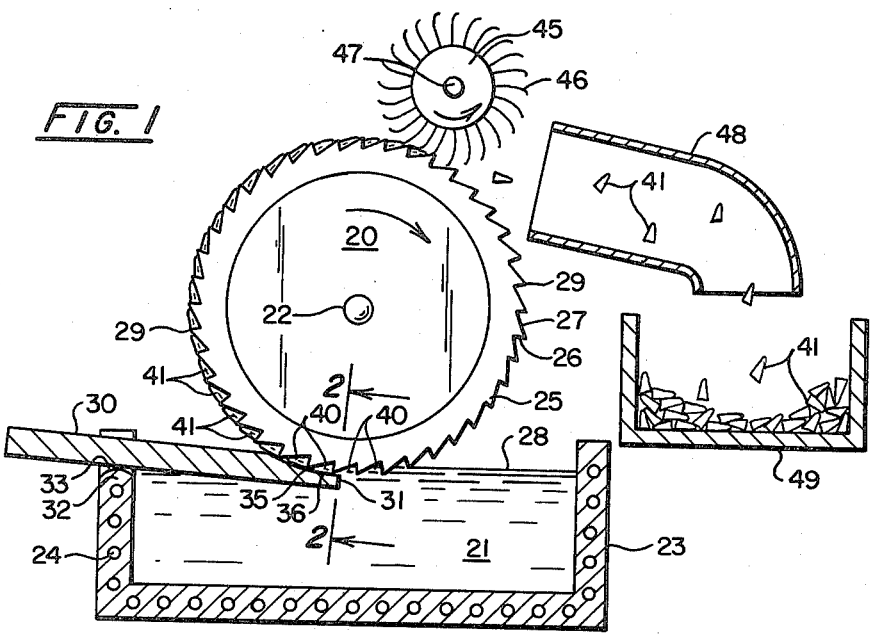
FIG. 1
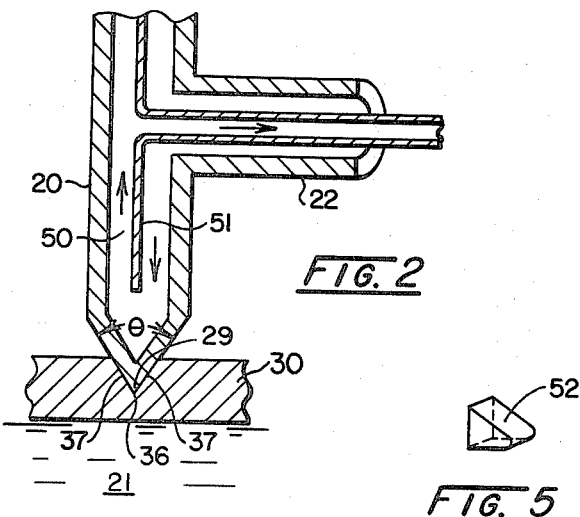
FIG. 2
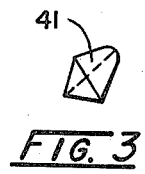
FIG. 3
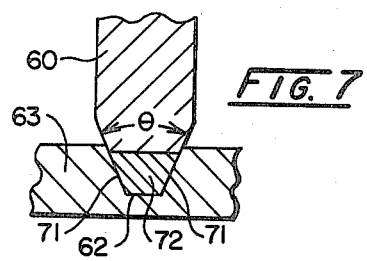
FIG. 5
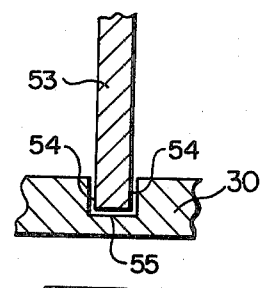
FIG. 4
FIG. 7
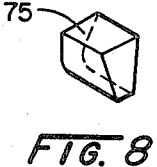
FIG. 8

METHOD AND APPARATUS FOR PRODUCING PARTICLES FROM A MOLTEN MATERIAL USING A ROTATING DISK HAVING A SERRATED PERIPHERY AND DAM MEANS

SUMMARY OF THE INVENTION

This invention relates to a method and apparatus for producing particulate directly from a supply of molten material by the use of a rotating member having discrete serrations in the periphery thereof. The leading surfaces of the serrations contact the molten material and propel a portion into the cavity formed by the surfaces of the serration while under the effect of a surface of a dam means. The serrations pass in proximity to the dam means.

As used herein, the terms particulate and particles refer to separate discrete bodies of material in the range of about 1 to 5 mm.; and in the sizes at the smaller end of the size range, the term includes particles frequently referred to as powders because of their small size.

Briefly, and in summary, this invention includes a method of producing particulate from molten material comprising: rotating a heat extracting disk having a serrated periphery of spaced adjacent serrations; followed by moving the serrations into the molten material; and then moving the serrations past and in proximity to a dam means in the molten material, while propelling a portion of molten material into the space between adjacent serrations; then molding each portion of molten material into a particle by effecting the portions with a surface of the dam means while at least partially solidifying each particle in the space between the serrations; moving the serrations beyond the proximity of the dam; and releasing each particle from the space between adjacent serrations.

The apparatus of this invention comprises equipment for producing particulate directly from molten material comprising: a heat extracting disk member having a serrated periphery of spaced adjacent serrations; means for supporting the molten material below the heat extracting disk member; means for rotating the disk member about its axis of rotation; means for raising and lowering the disk member relative to the molten material; and a dam means supported in a position beneath the surface of the molten material at a position in proximity to the periphery of the disk.

In recent years attention has been directed toward methods and apparatus which produce very fine particulate or powders. These particles are often useful for consolidation by hot isostatic compaction, sintering, hot extrusion, or hot forging and rolling processes which yield product with properties equivalent to or better than those of cold worked and heat treated materials. However, even more recently there has been an interest in particulate larger than powder because of the ease in handling such materials.

There are also other advantages in particulate of a controlled size larger than powder including the ease in measuring out finite amounts when mixing one material with another material while the materials are in the solid state. Also, if the particulate is maintained at a warm temperature just below solidus, it may be consolidated without being cooled and subsequently reheated.

The melt extraction process, in various variations as shown in U.S. Pat. Nos. 3,838,185, 3,904,344, 4,242,069, and 4,124,664, has been used to produce fine particulates in size ranges about 1 to 2 mm. or less in powder and flake form. While the melt extraction process is well suited for the production of these small or fine particles, it has been found that the process of this invention is better suited for the controlled production of slightly larger size uniform particles.

It is therefore an object of this invention to provide particulate by molding and forming each particle directly from a molten material in rapid succession on a rotating disk having a serrated periphery. It is another object to form the particulate into pre-selected shapes and sizes by the proper construction of the apparatus.

The method and apparatus of this invention is distinguished from previously described melt extraction in that relatively little solidification takes place while the portions of the periphery of the heat extracting disk are in contact with the pool of molten material. Instead, a molten portion of material is propelled out of contact with the pool to a cavity formed on two or more sides by the contour and shape of the serration, and on one or more other sides by the surfaces of a dam means. The serrations on the disk periphery pass in proximity to the surfaces of, and cooperate with the dam means providing for a short time a multi-sided cavity in which the major molten portion solidifies to a molded particle. This is in contrast to melt extraction in which virtually all of the particle solidifies in contact with the molten pool.

In the process of the invention the formation of the material into particulate is carried out directly from the molten state, and therefore inorganic compounds having properties in the molten state similar to that of molten metals and metal alloys may be formed in substantially the same manner. The properties that are preferably similar to those of molten metal are the viscosity and surface tension in the molten state, as well as having a substantially discrete melting point rather than the continuous range of viscosities characteristic of molten glasses. Materials conforming to the class for this invention, and having such properties, will preferably have a viscosity in the molten state, when at a temperature of within 25% of their equilibrium melting point in degrees Kelvin, in the range of $10^{-3}$ to 1 poise as well as having surface tension values in the same temperature range in the order of from 10 to 2500 dynes per centimeter.

In addition, the present invention is operable with metal alloys even though such alloys display a wide temperature range between the first solidification of any component within the alloy (the liquidus temperature) and the temperature at which the lowest melting point compositions solidify (the solidus temperature) yielding a completely solid material. For purposes of definition, such an alloy would be "molten" above the liquidus temperature even though there is some liquid material present at a temperature between the liquidus and the solidus temperatures. In certain circumstances, a vigorously stirred alloy could be considered sufficiently molten below the liquidus temperature for successful process operations.

Nevertheless, because the solidification takes place in a cavity it is believed that a wide range between the liquidus and solidus temperatures can be tolerated while maintaining production of uniform particulate.

Further features, advantages and understanding of the invention will be apparent from the following drawings and detailed description of the invention.

DESCRIPTION OF THE DRAWINGS

FIG. 1 is a vertical section semi-schematic view of the apparatus of this invention, showing a rotating heat extracting disk member having serrations on the periphery thereof on which the method of this invention may be practiced for producing particulate from molten material.

FIG. 2 is an enlarged cross-section of a heat extracting disk member, taken along the line 2—2 of FIG. 1.

FIG. 3 is a perspective view of one form of particulate produced by the method in the apparatus of this invention.

FIG. 4 is an enlarged cross-section of a tip of a serration passing through a dam means in place according to another embodiment of the invention.

FIG. 5 is a perspective view of a particle made according to the embodiment of FIG. 4.

FIG. 7 is an enlarged cross-sectional view taken along the line 7—7 of FIG. 6.

FIG. 8 is a perspective view of a particle made according to the embodiment of this invention shown in FIGS. 6 and 7.

DETAILED DESCRIPTION OF THE INVENTION

Figure 6:
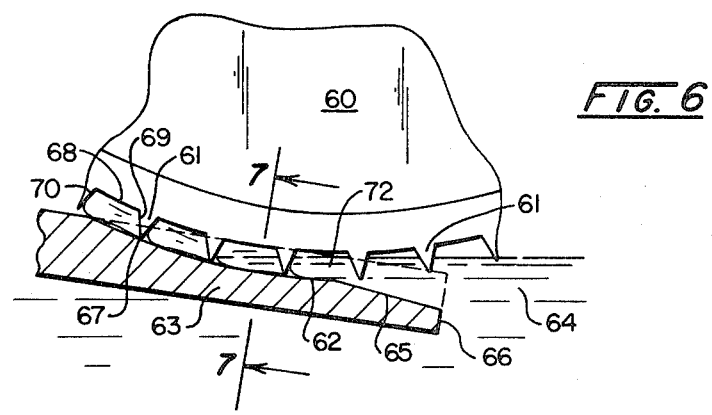
FIG. 6 is an enlarged elevation view of a portion of the disk member according to still another embodiment of this invention.

The means and apparatus by which the process of making particulate is carried out is shown in one embodiment in FIG. 1.

A heat extracting disk member 20 is rotated above a pool of molten material 21.

Disk 20 is rotated on a shaft 22 which is connected through a conventional type of transmission device, such as an electric motor, gear box or other well known apparatus not shown. The supply of molten material referred to as the melt 21 is heated and contained by a vessel 23 having elements 24 to heat the material contained to a temperature above its melting point.

Preparation of melts in pools of molten material is disclosed in U.S. Pat. No. 3,838,185. The apparatus controls associated therewith are also shown. The patent is assigned to the same assignee and incorporated herein as necessary for adequate understanding of this disclosure.

The outer "peripheral" edge of the disk 20 is provided with serrations or teeth 25 (sometimes synonomously referred to herein). Each tooth 25 has a leading edge 26 and a trailing edge 27. The terms "leading" and "trailing" refer to the direction of rotation of the disk 20 which is clockwise in FIG. 1 according to the arrow.

The disk 20 and the shaft 22 are arranged to be raised and lowered relative to the surface 28 of the molten material 21. When in operation under proper conditions, the distance between the shaft 22 and the surface 28 is reduced and the periphery of disk 20 is lowered into the surface 28 causing the leading edges 26 of serrations 25 to dip into the melt 21 propelling and/or scooping the molten material 21 forward in the direction of rotation of the disk member 20.

Referring to FIGS. 1 and 2, a dam means 30, shown as plate-like member, is supported beneath the disk member and in proximity to the serrations 25. The dam means 30 is immersed at one end 31 beneath the surface 28 of the melt 21; and is supported by suitable means 33 such as a wall 32 of the vessel 23. The support means 33 is constructed so that the position of the dam 30 may be adjusted either in angle and pressure, such as by curvature of the wall. This adjustment allows for changes in the proximity or contact of the dam means 30 with the serrations 25. Also, the depth of immersion or position of the end 31 in the melt 21 may be varied.

The vessel 23 and the dam means 30 are constructed of materials that will not melt in the molten temperature range of the material 21. As will be discussed later herein, the molten material may be a metal such as tin or aluminum in which case the material of the vessel 23 and the dam means 30 may be a ceramic or graphite.

In the preferred embodiment shown in FIGS. 1 and 2, the dam means 30 is constructed with a groove 35 having a bottom 36 and sides 37, and the disk 20 is constructed with a taper toward the peripheral edge 29 having an included angle $\theta$.

The bottom 36 of the groove 35 preferably generally conforms to the periphery generated by the edge 29 of the serrations 25 as they rotate about the center of the shaft 22 on the disk 20.

In the continued movement of the serrations 25 through the melt 21, a portion 40 of the melt 21 is propelled into the cavity formed by the leading edge 26 of one tooth 25 and the trailing edge 27 of the preceeding tooth 25. As the leading edge 26 passes the end 31, the portion 40 is propelled into the groove 35. As the sides of the serrations 25 continue to move through groove 35 in proximity to the sides 37, the portion 40 takes the configuration of the surfaces by which it is bounded, i.e. the sides 37 of the groove 35 and the leading and trailing edges 26 and 27, respectively, of the serrations. Simultaneously, partial solidification takes place at the edge surfaces of the portion 40.

Continued rotation of the disk member 20 brings the serration 25 and the portion 40 out of the groove at the top of the dam means 30. Solidificaton having taken place against the leading and trailing surfaces 26 and 27 respectively, solidified portions 40 stick to these surfaces and are carried around on the disk member 20 as particles 41.

At a convenient position in the further rotation, a means of wiping the serrations is shown in FIG. 1. A wiper wheel 45 made of wire brush-like fibers 46 is rotated on a shaft 47 in a position to wipe surfaces 26 and 27 and remove the particles 41.

In the embodiment shown, a chute 48 is positioned to receive and deflect the particles 41 into a container 49.

It has been found that wheel 45 may rotate in either direction and the particles will be expelled from the serrations 25, but when the wheel rotates at a rate more rapid than the periphery of the disk member 20, but with their contact surfaces moving in the same direction, the ejection is more uniform and controlled.

In the operation of the process of the invention, portions 40 remain mostly liquid until within the groove 35. Solidification of the portions 40 takes place while they are passing through the groove 35. This is in contrast to the process of melt extraction where the primary solidification takes place very rapidly on contact of a heat extracting disk member onto the surface of the molten material and the product is essentially solidified as it leaves the melt. Because the portions are molded and formed in the cavities formed by the serrations and the grooves, the process can be operated at a speed slower than melt extraction and in the range of between about 15 and 100 rpm's on a 20 cm diameter disk member (8 inch diameter). This translates to a tangental velocity in the groove of the dam between about 30 and 200 ft./min. A preferable speed range is 20 to 40 rpm. In this speed range the process is well controlled and turbulance is not a problem, though the leading edge 26 contacts the surface 28 of the melt 21 at or about an angle of 90°.

In the operation of the process, the molten material 21 in the vicinity of the entrance of the serrations 25 into the melt 21, and beyond where their propelled action takes place, the molten material 21 tends to move in the direction that the serrations 25 are moving. The end 31 of the dam means 30 serves to resist this motion and acts as a dam causing the molten material 21 to rise into the spaces between the leading edges 26 and the trailing edges 27 of the serrations 25.

It has been found that the process is operable in apparatus in which dam means 30 does not have any grooves. In this practice, the dam means 30 is brought into proximity of the end 29. The damming action of the end 31 causes the portion 40 to rise into the cavity between the serrations 25 and to be carried on the periphery of the disk 20 until the process is completed. Practice of the invention where the dam means 30 not provided with grooves produces an unrefined product having surfaces that are dimensionally controlled on only two sides, i.e. those which contact the leading edge and trailing edge of the serrations. Therefore, it appears that in the broader sense, the invention may be practiced by exerting a containing effect on the portions between the surfaces of the serrations. The portions are thus molded into particles by effecting the portions on at least one side with a surface of the dam, while at least partially solidifying each particle in the cavity between the serrations.

In the practice of the invention the serrations move past and in proximity to the dam while in the molten material. The degree of proximity may vary from being only near at a point, such as when the invention is practiced with pointed teeth on the periphery of the disk and a dam means without grooves; to a condition where the teeth of an edge-tapered disk rotate in a matching groove in the dam means and the dam means is raised until there is sliding contact between the sides of the teeth and the sides of the groove.

Therefore, when the term proximity is used herein, it is intended to cover a full range of constructions and process operations including from "operably nearby" to "sliding contact." It has been found when the dam is proximate to the periphery an effect is created on the portions in the spaced cavities of the serration. This effect provides a cooperation between the dam and the disk to constrain the molten material in the spaces between the serrations.

Referring to FIG. 2, the disk member 20 is shown as being hollow having means to circulate a coolant within the disk member 20 thereby keeping it and the edge 29 at a constant temperature once thermal equilibrium is established. The means by which the coolant flow rate is determined is readily discernible to one skilled in the art since the invention is operable within a broad range of disk member temperatures. The disk member 20 is provided with a hollow 50 and a baffle 51 around which a coolant fluid is circulated as shown by the arrows.

As seen in FIG. 3, a particle 41 in the form of a quadrahedron is formed by the two surfaces 26 and 27 of the serrations 25 and by the two side surfaces 37 of the groove 35. By way of example, an equilateral quadrahedron having a dimension of 0.125 inch on a side would be a typical particle produced by the process of this invention in the apparatus of FIG. 1.

Referring to FIGS. 4 and 5, a five sided triangular particle 52 will be produced by a disk member 53 having unbevelled surfaces 54 passing through a mating rectangular groove 55 in the dam means 30, and having serrations of the same elevational configuration as the serrations 25 shown on the disk member 20 of FIG. 1.

Referring to FIGS. 6, 7 and 8, in another embodiment of the invention, a disk member 60 is provided with serrations 61 which are constructed to pass through a groove 62 in a dam means 63 beneath the surface of a melt 64. The groove 62 is provided with an inclined entrance 65 at the end 66.

The serrations 61 are constructed with four intersecting transverse surfaces including an outer circumferential surface 67, and an inner circumferential surface 68 connected by a leading surface 69 and a trailing surface 70. Leading surface 69 is raked backwards with respect to the direction of rotation. The edge of the disk member 60 is tapered at an angle θ. The serrations 61 pass through the groove 62 in proximity to the sides of the groove 71. A portion of the molten material 72 is propelled into a cavity formed by a leading surface 69, a trailing surface 70 and the sides 71. A particle 75 is formed having six sides as shown in FIG. 8.

Figure 9:
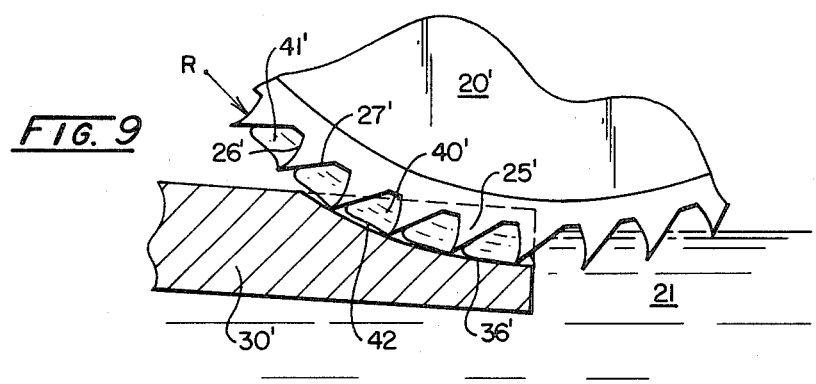
FIG. 9 is an enlarged elevational cross-section view of a portion of the disk member of another embodiment of this invention, and the dam means through which it passes.

In another embodiment of the invention shown in FIG. 9, serrations 25' pass through a groove 36' in a dam means 30'. A portion 40' of molten material 21' is propelled into a cavity formed by a leading edge 26' and a trailing edge 27' of the serration 25'. In this embodiment the leading edge 26' is concave having a radius R, providing for increased scooping action in propelling the portion 40'. Alternatively, the leading edge 26' may be raked forward in the direction of rotation.

Referring to FIG. 9, the outer surface of a particle 41' is shown with a slightly recessed surface 42 from the groove 36'. It has been found that in operation of the process under certain conditions shrinkage occurs in the cooling process. If there is not any excess material available at the edges of the portion 40', some shrinkage occurs causing the surface 42 to be slightly recessed.

Figure 10:
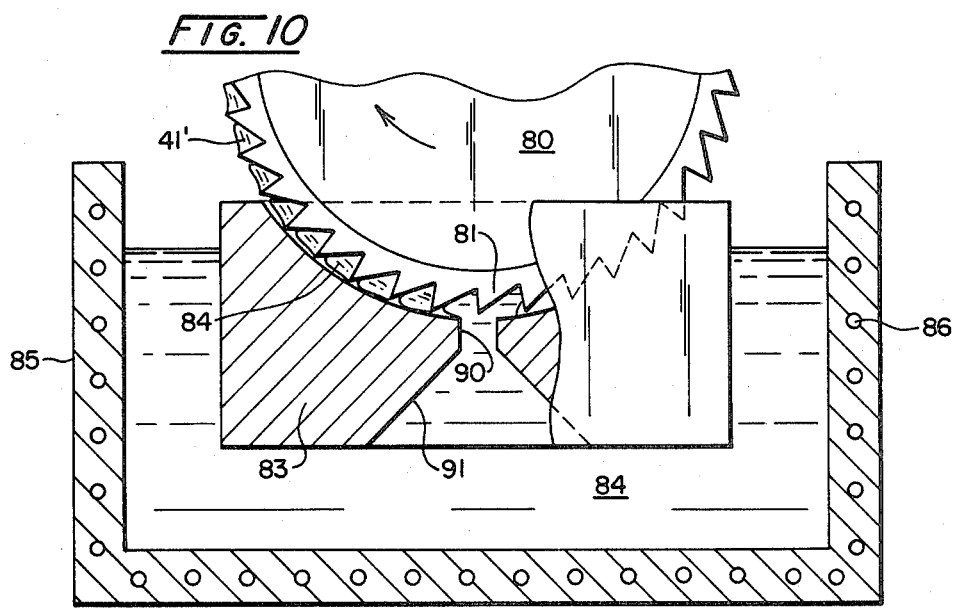
FIG. 10 is a vertical section view of a melt container apparatus showing another embodiment of the apparatus of this invention.

Still another embodiment of this invention is shown in FIG. 10 wherein a heat extracting disk member 80 having serrations 81 pass through a groove 82 in a dam means 83. The dam means 83 is supported or floating in a pool of molten material 84 which is supported in a container 85 that has heating means 86. An aperture 90 with a funnel-shaped entrance 91 is in communication between the container 85 and the groove 82.

In operation, molten material 84 rises upward through the aperture 90 and into the cavity formed by the sides of the groove 82 and the serrations 81 where a portion is propelled through the groove 82 outward on the periphery of the wheel and is molded into particles 41', in the same manner as previously described with the other embodiments of the invention.

The supply of molten material referred to as a melt 21 may be composed of an elemental metal, metal alloy, or an inorganic compound. While the amount of super heat will effect the operation of the process, it has been found that substantially uniform particles can be produced with a melt at a temperature of within 25% of the equilibrium melting point (in degrees K.) of the material used with no need for the precise control of the melt temperature during operation. While this quantitative definition of the preferred temperature will normally encompass the desired melt temperatures, it should be understood that the process does not require unusual melt temperatures or temperature controls. Therefore the metal process is believed to be operable with metals and metal alloys at conventional casting temperatures. The melt may have a thin protective flux coating to prevent excessive reaction with the surrounding atmosphere without substantially disturbing the formation of the particle 41. Where it is desired or necessary, the simplicity of the apparatus lends itself to the use of a simple container (not shown) where an inert atmosphere is provided surrounding the melt and the particles.

The kind of material that may be processed is believed to be most metals as well as chemical compounds and elements meeting the molten material requirements of, at a temperature within 25% of its equilibrium melting point in degrees K., the following properties: a surface tension in the range of 10 to 2500 dynes per centimeter, a viscosity in the range of $10^{-3}$ to 1 poise, a reasonably discrete melting point (i.e. a discontinuous temperature versus viscosity curve).

Further contrasting the process of this invention to melt extraction, the present process is more ideally suited for thicker, chunk-like particles, the shape of which can be controlled, and which will pack more densely when poured. Thick particles produced by melt extraction tend to have hollows in them as a result of the metal solidifying around the periphery and partly over the sides of the heat extracting disk. These hollows provide additional surface and decrease the packing density of the particulate. The present invention avoids these problems. A most important advantage of this invention is the higher productivity at relatively lower disk speeds. In the apparatus and process of this invention, all problems associated with vibration disappear because of the slower operating speeds.

The embodiments described above disclose that the cross-sectional shape of the general peripheral area of a disk 20 may be varied. However, there is an advantage to having a tapered periphery. This allows the contour of the dam to fit the sides of the teeth rather closely if held in place under slight pressure. If the sides of the teeth are normal to the disk axis, then precise machining is required so that the spacing between the tooth side and the dam surface can be held to a minimum. With a tapered tooth and a tapered groove in the dam means, any wear of the groove or tooth is compensated for by movement of the dam means, assuming the dam is held in contact with the tooth by a slight pressure. It is believed that the angle of taper should be ideally about 90°, but that good performance can be achieved with an angle of between 60° and 120°.

There may be an advantage to using a disk of large diameter since this provides more time for a particle to cool before it is released; however, there is probably no advantage to disks significantly smaller than about 6 inches.

The following specific examples, in conjunction with the teachings of the above specification and the cited prior art are sufficient to enable one skilled in the art to carry out the present invention as well as to understand what is presently known about the invention.

EXAMPLE I

Particles were produced using a molten pool apparatus in an air atmosphere, with molten tin. An 8 inch diameter single edge heat extracting disk of mild steel was rotated at a speed of 20 to 40 rpm and lowered into the surface of the pool of the melt. Serrations were of the form shown in FIGS. 1 and 2. The height of the serrations (i.e. the radial distance from the bottom of a tooth to the top of a tooth) was $\frac{3}{8}$ inch and $\theta = 90°$. Good particulate product having the shape shown in FIG. 3 was produced.

EXAMPLE II

Good product was also produced in the same apparatus using Tin-30W/O zinc alloy (solidus equals 450° F., liquidus equals 610° F.) at a temperature between 650° and 780° F.

EXAMPLE III

Using the same apparatus as Example I, and with a melt temperature of 1150° F., good product was produced with magnesium alloy AZ91B. In this example the apparatus was encased in a housing and the product was produced in a protective atmosphere.

It is herein understood that although the present invention has been specifically disclosed with the preferred embodiments and examples, modification and variations of the concepts herein disclosed may be resorted to by those skilled in the art. Such modifications and variations are considered to be within the scope of the invention and the appended claims.

What is claimed is:

1. A method of producing particulate from molten material comprising:
   (a) rotating a heat extracting disk having a serrated periphery of spaced adjacent serrations,
   (b) contacting the serrations on and into the molten material,
   (c) moving the serrations past and in proximity to a dam means in the molten material, and thereby propelling a portion of molten material into the space between adjacent serrations,
   (d) molding each portion of molten material into a particle by effecting the portions on at least one side with a surface of the dam while at least partially solidifying each portion into a particle in the space between adjacent serrations,
   (e) moving the serrations beyond proximity of the dam, and
   (f) releasing each particle from the space between adjacent serrations.

2. The method of claim 1, wherein said molten material contacted in step (b) is contained in a molten pool.

3. The method of claim 1 wherein the dam means has grooves through which the serrations pass.

4. A method according to claim 3 wherein the serrations pass in contact with the surfaces of the grooves.

5. The method of claim 1 wherein the disk has a tapering edge.

6. The method of claim 5 wherein the edge taper angle is in the range between 60° and 120°.

7. The method according to claim 5 wherein the edge taper angle is about 90°.

8. A method according to claim 1 wherein the dam means has an end beneath the surface of the molten material, the end being substantially parallel to a radius of the rotating disk and having grooves with surfaces that are tangent to the periphery of the rotating disk on the same radius of the rotating disk.

9. A method according to claim 1 wherein the speed of rotation of the heat extracting disk is between 15 and 100 rpm.

10. A method according to claim 1 wherein the molten material is a metal.

11. A method according to claim 10 wherein the metal is selected from the group consisting of magnesium, zinc or tin.

12. Apparatus for producing particles from molten material comprising:
    (a) means for supporting the molten material;
    (b) a heat extracting disk member having a serrated periphery of spaced adjacent serrations;
    (c) means for rotating the disk member about its axis of rotation;
    (d) means for raising and lowering the disk member relative to the molten material to move the serration into the molten material;
    (e) dam means supported in a position beneath the surface of the molten material and in cooperative proximity to the periphery of the disk to exert a containing effect on portions of material in adjacent serrations of the disk member when the disk is moved in the molten material, and when at least partial solidification is taking place.
    (f) means to release each particle from the serrated periphery after the disk is removed from the molten material.

13. Apparatus according to claim 12 wherein the dam means is adjustably supported relative to the disk.

14. Apparatus according to claim 12 wherein the dam means comprises a block supported in the molten material and has a groove therethrough, the block being positioned such that serrations of the disk member pass in proximity to the sides of the groove during rotation of the disk member, and an aperture in communication between the groove and a position below the surface of the molten material.

15. Apparatus according to claim 12 wherein the dam means has grooves through which the serrations pass during rotation of the heat extracting disk member.

16. Apparatus according to claim 12 wherein the dam means is constructed of a material that is inert to the molten material.

17. Apparatus according to claim 12 wherein the disk has a tapering edge.

18. Apparatus according to claim 17 wherein the included angle of the tapering edge is in the range between 60° and 120°.

19. Apparatus according to claim 17 wherein the included angle of the tapering edge is about 90°.

20. Apparatus according to claim 12 wherein each serration comprises two surfaces which move in radial rotation about the axis of rotation of the disk member, one surface of which leads in rotation and the other surface of which trails in rotation.

21. Apparatus according to claim 20 wherein the leading surface in rotation is in a plane which passes through the axis of rotation of the disk member.

22. Apparatus according to claim 20 wherein the leading surface is raked forward at the periphery of the disk in the direction of rotation of the disk member.

23. Apparatus according to claim 20 wherein the leading surface is raked backward at the periphery of the disk from the direction of rotation of the disk member.

24. Apparatus according to claim 20 wherein the leading surface is concave with respect to a radial plane that passes through the axis of rotation of the disk.

* * * * *